United States Patent
Jensen et al.

(10) Patent No.: US 9,725,775 B2
(45) Date of Patent: Aug. 8, 2017

(54) DIFFUSER

(75) Inventors: Craig Jensen, Umdloti Beach (ZA); Leon Smith, Amanzimtoti (ZA)

(73) Assignee: Tongaat Hulett Limited, Kwazulu Natal (ZA)

( * ) Notice: Subject to any disclaimer, the term of this patent is extended or adjusted under 35 U.S.C. 154(b) by 713 days.

(21) Appl. No.: 14/235,122

(22) PCT Filed: Jul. 16, 2012

(86) PCT No.: PCT/IB2012/053623
§ 371 (c)(1),
(2), (4) Date: Apr. 24, 2014

(87) PCT Pub. No.: WO2013/014571
PCT Pub. Date: Jan. 31, 2013

(65) Prior Publication Data
US 2014/0238388 A1    Aug. 28, 2014

(30) Foreign Application Priority Data
Jul. 28, 2011   (ZA) .................................. 2011/05569

(51) Int. Cl.
*C13B 10/02*   (2011.01)
*C13B 10/10*   (2011.01)
*B01D 11/02*   (2006.01)

(52) U.S. Cl.
CPC ............ *C13B 10/02* (2013.01); *B01D 11/023* (2013.01); *C13B 10/107* (2013.01)

(58) Field of Classification Search
CPC ...... C13B 10/02; C13B 10/107; B01D 11/023
See application file for complete search history.

(56) References Cited

FOREIGN PATENT DOCUMENTS

| AU | 416230 B2 | 8/1971 |
|---|---|---|
| NL | 280161 A | 12/1964 |
| WO | WO 2007/015124 | 2/2007 |

OTHER PUBLICATIONS

International Search Report issued in International Application No. PCT/IB2012/053623 and mailed on Dec. 13, 2012.

*Primary Examiner* — David A Reifsnyder
(74) *Attorney, Agent, or Firm* — Buchanan Ingersoll & Rooney PC

(57) ABSTRACT

A chain driven diffuser for use in a sugar extraction process, the diffuser including a diffuser floor, a plurality of chain ladder assemblies being displaceable relative to the diffuser floor, with each chain ld-der assembly comprising two opposing chains being driven by drive sprockets characterized in that at least some of the drive sprockets of the diffuser are driven independently from some of the other drive sprockets of the diffusor.

16 Claims, 2 Drawing Sheets

DIFFUSER

CROSS-REFERENCE TO RELATED APPLICATIONS

This application is a U.S. National Stage patent application pursuant to 35 U.S.C. §371 of International Patent Application PCT/IB2012/053623, filed on Jul. 16, 2012, and published as WO 2013/014571 on Jan. 31, 2013, which claims priority to South African Patent Application No. 2011/05569 filed on Jul. 28, 2011, the content of each being hereby expressly incorporated by reference in their entireties for all purposes.

BACKGROUND TO THE INVENTION

THIS invention relates to a diffuser and more particularly to a chain diffuser for use in a sugar extraction process.

A diffuser is an apparatus commonly used in the sugar industry to extract sugar-bearing juice from shredded cane or bagasse. Operation of a diffuser is based on systematic counter current washing of the cane or bagasse by means of imbibition water. This is achieved by forming a bed of cane or bagasse on a conveyor, while copious quantities of water and thin juice is allowed to percolate through the bed to wash out the sugar bearing juice. The water is added at the discharge end of the conveyor and is pumped forward stage by stage towards the feed end, with each stage being defined by a completed percolation cycle. The process is repeated until the juice reaches maximum concentration at the feed end of the diffuser.

A typical diffuser is 60 m long by 6-12 m wide. The floor of the vessel is made of perforated plate, over which a carrier rides. The carrier is in the form of chains with slats (conveyor grids) between two chains which drags the slats through the diffuser. A pair of chains and its slats is commonly known as a 'chain ladders' with a width of approximately one to two meters. The drag chains are supported on chain runners (or wear strips) along the length of the diffuser and are driven with sprockets at the headshaft through a common headshaft. The return length of the chains is either supported by return idlers or a return runner. The tailshaft is in the form of a smooth idler.

The chain ladders drag the cane along at a speed of about 1 meter per minute. Under the perforated floor, the diffuser is divided into 10-12 stages, each stage analogous to a single milling unit. Press water and imbibition are added ahead of Stage 12; thin juice from Stage 12 is recycled and added ahead of Stage 11; thin juice from Stage 11 is recycled and added ahead of Stage 10—and so on until the juice is withdrawn from Stage 1. A portion of the Stage 1 juice is tapped off, heated, and poured onto the incoming cane to saturate and heat it. This fraction of juice is called scalding juice. The bulk of the juice is sent to the process stream for further processing.

The discharge end of the diffuser is sealed by a rotating weighted drum which dewaters the cane to some extent. A spiked rotor called a kicker breaks off chunks of the hot fibre that then fall onto a carrier that feeds the dewatering mill.

Percolation through the fibre bed is critical in a diffuser. Batteries of lifting screws disturb the bed, preventing any packing that may occur during its 1-hour travel through the diffuser. A blinded bed results in juice travelling over the top of the fibre, and the diffuser is then said to be flooded. Imbibition rates tend to be higher for a diffuser than for a mill, while similar extractions can be obtained. Where one (or two) conventional mills precede a diffuser, that diffuser is referred to as a bagasse diffuser. A cane diffuser handles prepared cane.

Current diffuser designs utilize a large head shaft and drive to drag the bed of cane through the diffuser. Although this works well from a process perspective, a number of disadvantages are associated with this configuration when viewed from a mechanical and structural perspective. These include:

The load on the head shaft is high and large amounts of steel are required for manufacturing the head shaft;
Foundations are substantial and expensive;
A large and expensive single drive is required;
The drive cannot be viably kept as a stock item, thus resulting in substantial downtime should there be a major failure; and
The width of the diffuser is fixed at the time of manufacture due to the continuous head shaft, and expansion of capacity by widening the diffuser will entail replacement of the entire head shaft and drive, thus rendering expansion commercially not viable.

To reduce the cost of manufacture a "walking floor diffuser" has been suggested, and is currently used in industry, for example WO2007/015124. The walking floor diffuser utilises an established method for moving bagasse, and comprises a series of strips of perforated plates/panels that all move forward at the rate at which it is desired that the bagasse or cane mat will travel. The plates/panels are moved hydraulically, and this type of diffuser does not use a chain driven system. Plates or panels are rapidly returned to the feed end of the diffuser once the discharge end is reached. In this way the floor slowly moves the bagasse forward. The advantage is that there is no head shaft and drive, and the diffuser is therefore expandable in width by adding more rows of perforated plate/panels. However, there are a number of disadvantages with this particular arrangement. These include:

The bagasse tends to block the perforated plate because the scraping action of the chain and slats are not present;
The hydraulic drive arrangement is complex and expensive to maintain;
Controls are complex and any sequencing problems result in fractures of the plates;
The perforated plates carry the entire weight of the bagasse bed, thus resulting in excessive wear;
The bagasse tends to compact; and
The rapidly returning strip of perforated plate results in juice bypassing the intended counter current flow path, and extraction efficiency is reduced.

It is accordingly an object of the invention to provide a diffuser that will, at least partially, alleviate the above disadvantages.

It is also an object of the invention to provide a diffuser which will be a useful alternative to existing diffusers.

SUMMARY OF THE INVENTION

According to the invention there is provided a chain driven diffuser for use in a sugar extraction process, the diffuser including:
a diffuser floor;
a plurality of chain ladder assemblies being displaceable relative to the diffuser floor, with each chain ladder assembly comprising two opposing chains being driven by drive sprockets;

characterized in that at least some of the drive sprockets of the diffuser are driven independently from other of the drive sprockets of the diffuser.

In one embodiment there is provided for the diffuser to include at least two independent drive shafts, with each drive shaft carrying a number of drive sprockets. There is provided for each drive shaft to be driven by a driving means which is preferably in the form of a motor (electric or hydraulic) that drives a gearbox, which in turn drives the driveshaft. Driving means may be provided at one end of each drive shaft, alternatively at opposing ends of each drive shaft.

In another embodiment there is provided for the sprockets to be driven independently, or in groupings of two, by way of direct driving means without the use of drive shafts.

Each sprocket may be independently driven by a driving means.

Two adjacent sprockets of two adjacent chain ladder assemblies may be driven by a mutual driving means.

The driving means may be in the form of a motor and gearbox arrangement.

There is further provided for a sprocket to be mounted on a stewing ring bearing, and for the geared section of the slewing ring bearing to be driven by the driving means. There is also provided for two sprockets to be mounted on the same geared section of the slewing ring.

The slewing ring may be driven by a single pinion driven by a single driving means.

The slewing ring may be driven by multiple pinions, each of which is driven by its own driving means.

The slewing ring may be driven by multiple planet pinions, which may in turn be driven by a sun gear. The sun gear may be driven by its own driving means. Alternatively, a number of sun gears of adjacent sprocket arrangements may be driven by a single drive shaft.

According to a further aspect of the invention there is provided a chain diffuser suitable for use in a sugar extraction process, the diffuser characterized in that it is modularly expandable by increasing the width, and thus the number of ladder assemblies, of the diffuser,

BRIEF DESCRIPTION OF THE DRAWINGS

A number of embodiments of the invention are described by way of non-limiting examples, and with reference to the accompanying schematic drawings in which.

DETAILED DESCRIPTION OF INVENTION

Figure 1:
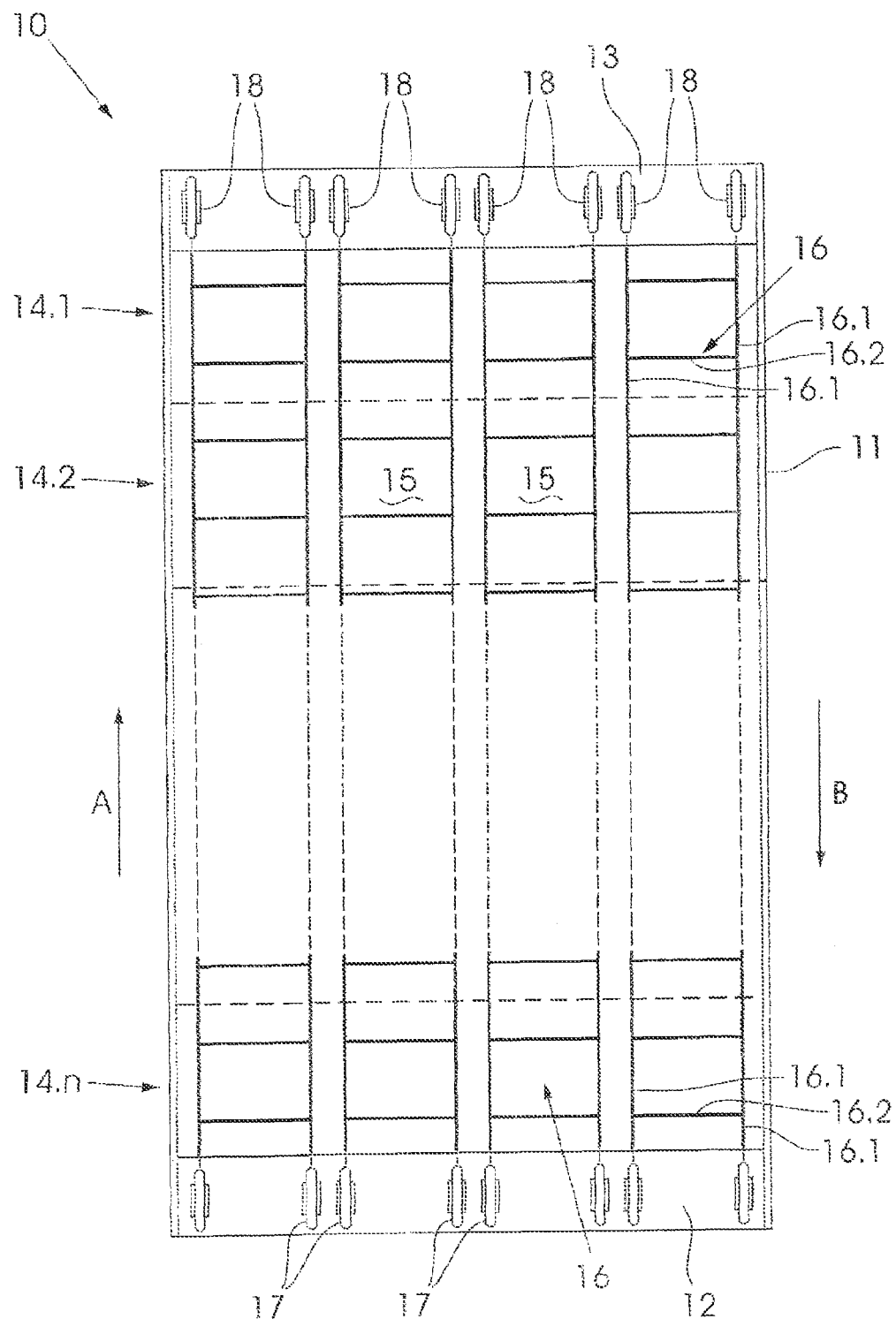
FIG. 1 is a simplified schematic representation of a Prior Art Diffuser.

Referring to the drawings, in which like numerals indicate like features, a non-limiting example of diffuser in accordance with the invention is generally indicated by reference numeral 10.

The diffuser 10 is in particular a chain driven diffuser, and includes a primary housing 11 having a perforated floor 15 for receiving shredded cane or bagasse. The cane or bagasse is fed into the diffuser 10 at a feed end 12, and is displaced towards a discharge end 13, while imibibtion water percolates through the bed of cane or bagasse in a countercurrent configuration. More particularly, the diffuser 10 is divided in a number of stages (14.1, 14.2 ... 14.n), each including a fluid collection hopper there below, and a fluid displacement means to pump the fluid to a subsequent stage. The effective movement of the imbibition water is in the direction of arrow B, i.e. from the discharge end 13 of the diffuser 10 towards the feed end 12, which is in the opposite direction to the movement of the cane or bagasse, indicated by arrow A.

The cane or bagasse is displaced along the floor 15 of the diffuser 10 by way of a mechanical displacement arrangement, and in particular by way of a plurality of parallel chain ladders 16. Each chain ladder 16 comprises two opposing drive chains 16.1, with slats 16.2 extending therebetween so as to form articulated frames. The drive chains 16.1 are driven by drive sprockets 18 at one extremity, and mounted on idling sprockets or wheels 17 at an opposing end thereof.

The above description describes state of the art diffuser equipment, and is therefore not the primary focus of the present invention. The gist of the present invention resides in the modular nature of a new diffuser, and in particular also the new and inventive drive configurations that enables the diffuser to be modular. In the context of the specification, modular should be understood to mean the addition of more ladder assemblies (and of course the corresponding expansion of the floor and primary vessel) in order to increase the width of the diffuser.

A number of options are proposed to achieve this functionality, and are described in more detail hereinbelow. However, the common denominator is that none of the proposed new drive arrangements uses a single headshaft to drive the driving sprockets. Until now the single headshaft, which is consistently used in chain driven diffusers, has been the primary impediment to the modular expansion of chain diffusers. However, this problem is addressed by utilizing, inter alis, any one of the drive arrangement of FIGS. 2 to 5.

Figure 2:
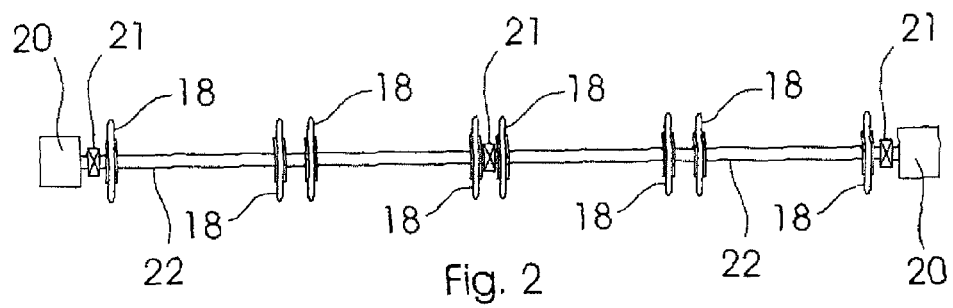
FIG. 2 is a first embodiment of a drive arrangement of the diffuser.
Figure 3:
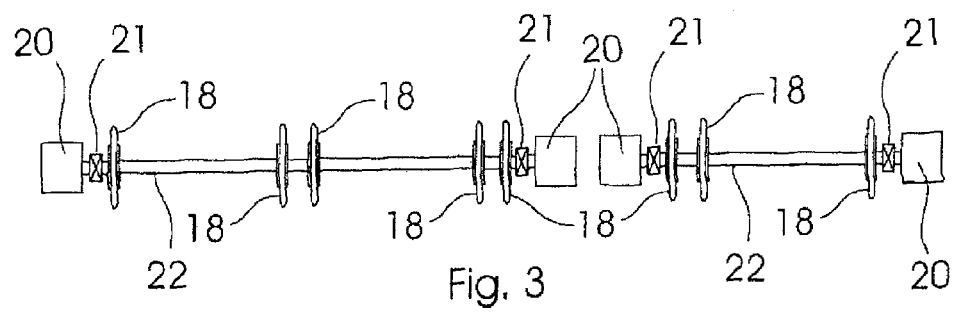
FIG. 3 is a second embodiment of a drive arrangement of diffuser.

FIG. 2 shows a drive arrangement in which the headshaft has been split into two separate drive shafts 22, each of which is driven at one end by a driving means 20. The driving means 20 is typically in the form of a motor and gearbox combination. An additional bearing point 21 is provided between the two drive shafts. FIG. 3 is a further improvement of the drive arrangement of FIG. 2, in that the drive shafts 22 are driven form both ends, resulting in the use of smaller diameter drive shafts, as well as smaller motors and gearboxes. In both the embodiments of FIGS. 2 and 3 the single headshaft used in the prior art has been done away with, and replaced with independent drive shafts 22, which makes it more cost efficient to extend the width of the diffuser, as an additional drive shaft 22 (and its associated sprockets and chain ladder assemblies) can be added to the diffuser.

Figure 4:
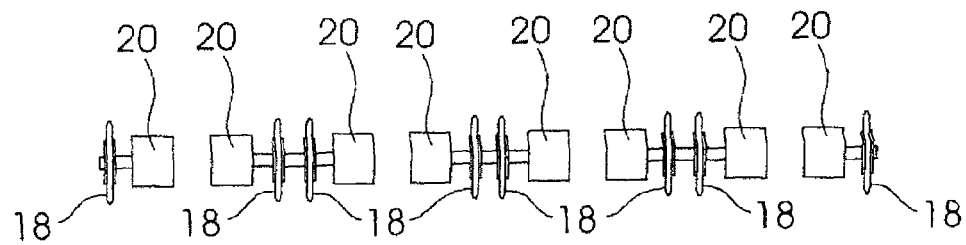
FIG. 4 is a third embodiment of a drive arrangement of the diffuser.

A different approach to achieve the same goal (i.e. doing away with the single headshaft) may be to do away with the use of drive shafts altogether, by directly driving the drive sprockets 22. A first embodiment of this approach is schematically illustrated in FIG. 4, in which each sprocket is driven by a dedicated driving means 20. A further refinement of this embodiment is shown in FIG. 5, and in this case adjacent driving sprockets of adjoining chain ladder assemblies are driven by a common driving means, thus reducing the number of required driving means.

Figure 5:
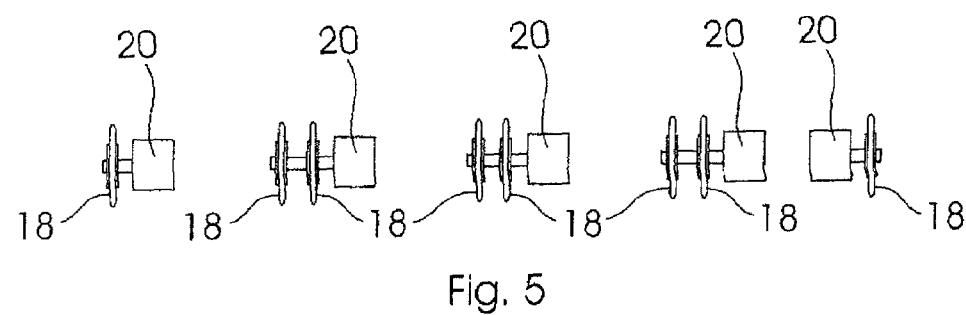
FIG. 5 is a fourth embodiment of a drive arrangement of the diffuser.

The driving means 20 and arrangements utilized in the embodiments of FIGS. 4 and 5 can take various forms. A first option is to use electric motors that drive the sprockets via right angle gearboxes. The right angle gearboxes will be required due to the space constraints associated with the embodiments of FIGS. 4 and 5.

Another option is to mount the sprockets on slewing ring bearings, which then enables a number of alternative driving arrangements. Some examples include:

The slewing ring of the bearing is driven by a single pinion, which is in turn driven by suitable driving means;

The slewing ring of the bearing is driven by multiple pinions, each of which is driven by its own driving means;

The stewing ring of the bearing is driven by multiple planet pinions that are driven by a sun gear, with the sun gear being driven by a driving means; and The slewing ring of the bearing is driven by multiple planet pinions that are driven by a sun gear, with multiple sun gears of different slewing ring bearings being driven by a common driving means.

It will be appreciated that there are various other configurations that will suffice, but again the common denominator is the omission of a common headshaft and to still use chains or ropes with slats attached to drag the cane through the diffuser.

The drive arrangements described above facilitate the adoption of a modular design philosophy across the width of a chain diffuser. The smallest module would be a single chain ladder, but multiple chain ladders may also comprise an individual module. The overall width of the diffuser is determined by the width of the individual module and the total number of modules. In this way a diffuser will consist of a set of modules that will drag the bagasse bed in the conventional way—with all the advantages of the chain diffuser. Some of the advantages of this approach include the following:

Smaller drives which are cheaper and "off the shelf";

Gears and mechanicals are reduced in size to standard units;

Standard size modules can be used as components in different size diffusers; and Ease of expansion of an installed diffuser by adding additional modules.

It will be appreciated that the above are only some embodiments of the invention and that there may be many variations without departing from the spirit and/or the scope of the invention.

The invention claimed is:

1. A chain driven diffuser for use in a sugar extraction process, the diffuser including:
a perforated diffuser floor; and
a plurality of chain ladder assemblies being displaceable relative to the perforated diffuser floor, with each chain ladder assembly comprising two opposing chains being driven by drive sprockets and having slats extending therebetween so as to form an articulated frame; that wherein at least one of the drive sprockets of at least one of the chain ladder assemblies is driven independently from at least one other of the drive sprockets of at least one other of the chain ladder assemblies.

2. The chain driven diffuser of claim 1, in which the diffuser includes at least two independent drive shafts, each independent drive shaft carrying a number of drive sprockets.

3. The chain driven diffuser of claim 2, wherein each independent drive shaft is driven by a driving means, which in turn drives the drive shaft.

4. The chain driven diffuser of claim 3, wherein the driving means comprises a motor that drives a gearbox.

5. The chain driven diffuser of claim 3 or claim 4, wherein driving means are provided at one end of each drive shaft.

6. The chain driven diffuser of claim 3 or claim 4, wherein driving means are provided at opposing ends of each drive shaft.

7. The chain driven diffuser of claim 1, wherein at least one of the drive sprockets of at least one of the chain ladder assemblies is driven by way of direct driving means without the use of drive shafts.

8. The chain driven diffuser of claim 7, wherein each of the drive sprockets of each of the chain ladder assemblies is independently driven by direct driving means.

9. The chain driven diffuser of claim 7, wherein two adjacent drive sprockets of two adjacent of said plurality of chain ladder assemblies are driven by a common driving means.

10. The chain driven diffuser of claim 7, wherein the driving means comprises a motor and gearbox arrangement.

11. The chain driven diffuser of claim 7, wherein at least one of the drive sprockets of at least one of the chain ladder assemblies is mounted on a slewing ring bearing, and wherein a geared section of the slewing ring bearing is driven by the driving means.

12. The chain driven diffuser of claim 11, wherein two adjacent drive sprockets of two adjacent of said plurality of chain ladder assemblies are mounted on the same geared section of the slewing ring bearing.

13. The chain driven diffuser of claim 12, wherein the slewing ring is driven by a single pinion, which is in turn driven by a single driving means.

14. The chain driven diffuser of claim 12, wherein the slewing ring is driven by multiple pinions, each of which is driven by its own driving means.

15. The chain driven diffuser of claim 12, wherein the slewing ring is driven by multiple planet pinions, which may in turn be driven by a sun gear.

16. The chain driven diffuser of claim 15, wherein a number of sun gears of adjacent sprocket arrangements are driven by a single drive shaft.

* * * * *